United States Patent
Chen et al.

(10) Patent No.: US 11,937,319 B2
(45) Date of Patent: Mar. 19, 2024

(54) INTEGRITY PROTECTION HANDLING AT THE GNB-CU-UP

(71) Applicant: NEC CORPORATION, Tokyo (JP)

(72) Inventors: Yuhua Chen, Tokyo (JP); Sadafuku Hayashi, Tokyo (JP); Hisashi Futaki, Tokyo (JP); Jagdeep Ahluwalia Singh, Tokyo (JP); Neeraj Gupta, Tokyo (JP); Chadi Khirallah, Tokyo (JP)

(73) Assignee: NEC CORPORATION, Tokyo (JP)

( * ) Notice: Subject to any disclaimer, the term of this patent is extended or adjusted under 35 U.S.C. 154(b) by 595 days.

(21) Appl. No.: 17/252,057

(22) PCT Filed: Jun. 14, 2019

(86) PCT No.: PCT/JP2019/023672
§ 371 (c)(1),
(2) Date: Dec. 14, 2020

(87) PCT Pub. No.: WO2019/244793
PCT Pub. Date: Dec. 26, 2019

(65) Prior Publication Data
US 2021/0306848 A1   Sep. 30, 2021

(30) Foreign Application Priority Data
Jun. 22, 2018   (GB) ..................................... 1810340

(51) Int. Cl.
*H04B 1/00* (2006.01)
*H04W 76/18* (2018.01)

(52) U.S. Cl.
CPC .................. *H04W 76/18* (2018.02)

(58) Field of Classification Search
CPC ...................................................... H04W 76/18
See application file for complete search history.

(56) References Cited

U.S. PATENT DOCUMENTS

| 2017/0257796 A1* | 9/2017 | Hsu ........................ H04L 69/04 |
| 2019/0020688 A1 | 1/2019 | Miao et al. |
| 2019/0028925 A1 | 1/2019 | Chun et al. |

FOREIGN PATENT DOCUMENTS

| EP | 3479647 A1 | 5/2019 |
| EP | 3512296 A1 | 7/2019 |
| WO | 2010/088795 A1 | 8/2010 |

(Continued)

OTHER PUBLICATIONS

"3rd Generation Partnership Project; Technical Specification Group Radio Access Network; NR; NR and NG-RAN Overall Description; Stage 2 (Release 15)", 3GPP TS 38.300 V15.1.0, Mar. 2018, 71 pages.

(Continued)

*Primary Examiner* — Erika A Washington
(74) *Attorney, Agent, or Firm* — Sughrue Mion, PLLC

(57) ABSTRACT

A communication system is disclosed in which a distributed base station apparatus comprises a central unit for control plane signalling (CU-CP), at least one a central unit for user plane signalling (CU-UP), and at least one distributed unit. The CU-CP obtains information indicating whether a security configuration is supported by a CU-UP and selects a security configuration for an item of user equipment (UE) based on the obtained information.

9 Claims, 10 Drawing Sheets

(56) References Cited

FOREIGN PATENT DOCUMENTS

WO     2017/105077 A1     6/2017
WO     2017/152360 A1     9/2017

OTHER PUBLICATIONS

"3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340 V15.1.0, Mar. 2018, 52 pages.
"3rd Generation Partnership Project; Technical Specification Group Radio Access Network; NG-RAN; Architecture description (Release 15)", 3GPP TS 38.401 V15.1.0, Mar. 2018, 23 pages.
"3rd Generation Partnership Project; Technical Specification Group Radio Access Network; NG-RAN; E1 general aspects and principles (Release 15)", 3GPP TS 38.460 V1.0.0, Jun. 2018, 10 pages.
"3rd Generation Partnership Project; Technical Specification Group Services and System Aspects; Security architecture and procedures for 5G system (Release 15)", 3GPP TS 33.501 V15.0.0, Mar. 2018, 128 pages.
"3rd Generation Partnership Project; Technical Specification Group Radio Access Network; NR; Radio Resource Control (RRC) protocol specification (Release 15)", 3GPP TS 38.331 V15.1.0, Mar. 2018, 268 pages.
"3rd Generation Partnership Project; Technical Specification Group Radio Access Network; NR-RAN; E1 application protocol (E1AP) (Release 15)", 3GPP TS 38.463 V0.3.0, May 2018, 132 pages.
Ericsson, "Bearer Context Setup procedure", 3GPP TSG-RAN WG3 #100, Tdoc R3-183213, May 21-25, 2020, 2018, 21 pages.
Samsung, "CU-UP Security Capability indication to CU-CP", 3GPP TSG-RAN WG3 #99bis, R3-182079, Apr. 16, 2018-Apr. 20, 2018, 1 page.
Ericsson, "E1 Setup procedure", 3GPP TSG-RAN WG3 #99bis, R3-182237, Apr. 16, 2018-Apr. 20, 2018, 5 pages.
LG Electronics Inc., "Issues on Security for CU-CP and CU-UP Separation", 3GPP TSG-RAN WG3 Meeting NR Ad hoc, R3-172480, Jun. 27, 2017-Jun. 29, 2017, 2 pages.
United Kingdom Search Report for GB1810340.8 dated Nov. 23, 2018.
International Search Report for PCT/JP2019/023672 dated Oct. 9, 2019 [PCT/ISA/210].
Written Opinion for PCT/JP2019/023672 dated Oct. 9, 2019 [PCT/ISA/237].
Japanese Office Action for JP Application No. 2020-570999 dated Feb. 8, 2022 with English Translation.
Ericsson, Presentation of Specification/Report to TSG: TS38.463, Version 1.0.0 [online], 3GPP TSG RAN #80 RP-181154, Internet<URL:https://www.3gpp.org/ftp/tsg_ran/TSG_RAN/TSGR_80/Docs/RP-181154.zip>, Jun. 4. 2018, pp. 23-26,37-68.
NEC, Stage 3: Solution for RAN paging failure: Use of UE Context Release [online], 3GPP TSG RAN WG3 #95 R3-170578, Internet<URL:http://www.3gpp.org/ftp/tsg_ran/WG3_lu/TSGR3_95/Docs/R3-170578.zip>, Feb. 7, 2017, pp. 3-8, 12-19.
NEC, (TP for NR BL CR for TS 38.463): discussion on security algorithms and ROHC profile for CP and UP separation [online], 3GPP TSG RAN WG3 #101 R3-184724, Internet<URL:https://www.3gpp.org/ftp/tsg_ran/WG3_lu/TSGR3_101/Docs/R3-184724.zip>, Aug. 10, 2018.
CN Office Action for CN Application No. 201980040984.7, dated Nov. 7, 2023 with English Translation.

* cited by examiner

INTEGRITY PROTECTION HANDLING AT THE GNB-CU-UP

CROSS REFERENCE TO RELATED APPLICATIONS

This application is a National Stage of International Application No. PCT/JP2019/023672 filed Jun. 14, 2019, claiming priority based on United Kingdom Patent Application No. 1810340.8 filed Jun. 22, 2018, the disclosure of which is incorporated herein in its entirety by reference.

TECHNICAL FIELD

The present invention relates to a radio access network in a cellular or wireless telecommunications network, and particularly but not exclusively to the provision of 'distributed' base station functionality via a central unit and one or more distributed units. The invention has particular but not exclusive relevance to wireless telecommunications networks implemented according to various standards defined by the 3rd Generation Partnership Project (3GPP). For example, the invention has relevance to Long Term Evolution (LTE) networks, LTE Advanced (LTE-A) networks, related enhancements to and developments of LTE/LTE-A, and to the more recent development of communication technologies beyond LTE/LTE-A into so-called '5G' or 'new radio' (NR) technologies.

BACKGROUND ART

The latest developments of the 3GPP standards are referred to as the Long Term Evolution (LTE) of Evolved Packet Core (EPC) network and Evolved UMTS Terrestrial Radio Access Network (E-UTRAN), also commonly referred as '4G'. In addition, the term '5G' and 'new radio' (NR) refer to an evolving communication technology that is expected to support a variety of applications and services such as Machine Type Communications (MTC), Internet of Things (IoT) communications, vehicular communications and autonomous cars, high resolution video streaming, smart city services, and/or the like. Accordingly, 5G technologies are expected to enable network access for vertical markets and support network (RAN) sharing for offering networking services to third parties and for creating new business opportunities. 3GPP intends to support 5G by way of the so-called 3GPP Next Generation (NextGen) radio access network (RAN) and the 3GPP NextGen core (NGC) network. Various details of 5G networks are described in, for example, the 'NGMN 5G White Paper' V1.0 by the Next Generation Mobile Networks (NGMN) Alliance, which document is available from https://www.ngmn.org/5g-white-paper.html.

Whilst a base station of a 5G/NR communication system is commonly referred to as a New Radio Base Station ('NR-BS') or as a 'gNB' it will be appreciated that they may be referred to using the term, eNB (or 5G/NR eNB) which is more typically associated with LTE base stations. 3GPP Technical Specification (TS) 38.300 V15.1.0 and TS 37.340 V15.1.0 define the following nodes, amongst others:

gNB: node providing NR user plane and control plane protocol terminations towards the UE, and connected via the NG interface to the 5G core network (5GC).

ng-eNB: node providing E-UTRA user plane and control plane protocol terminations towards the UE, and connected via the NG interface to the 5GC.

En-gNB: node providing NR user plane and control plane protocol terminations towards the UE, and acting as Secondary Node in E-UTRA-NR Dual Connectivity (EN-DC).

NG-RAN node: either a gNB or an ng-eNB.

3GPP also defined the so-called 'Xn' interface as the network interface between neighbouring NG-RAN nodes.

Recently, it has been proposed that the functionality of a gNB (referred to herein as a 'distributed' gNB) may be split between one or more distributed units (DUs) and a central unit (CU) with a CU typically performing higher level functions and communication with the next generation core and with the DU performing lower level functions and communication over an air interface with user equipment (UE) in the vicinity (i.e. in a cell operated by the gNB). Specifically, 3GPP TS 38.401 V15.1.0 specifies the following functional units:

gNB Central Unit (gNB-CU): a logical node hosting Radio Resource Control (RRC), Service Data Adaptation Protocol (SDAP) and Packet Data Convergence Protocol (PDCP) layers of the gNB or RRC and PDCP layers of the En-gNB that controls the operation of one or more gNB-DUs. The gNB-CU terminates the F1 interface connected with the gNB-DU.

gNB Distributed Unit (gNB-DU): a logical node hosting Radio Link Control (RLC), Medium Access Control (MAC) and Physical (PHY) layers of the gNB or En-gNB, and its operation is partly controlled by gNB-CU. One gNB-DU supports one or multiple cells. One cell is supported by only one gNB-DU. The gNB-DU terminates the F1 interface connected with the gNB-CU.

gNB-CU-Control Plane (gNB-CU-CP): a logical node hosting the RRC and the control plane part of the PDCP protocol of the gNB-CU for an En-gNB or a gNB. The gNB-CU-CP terminates the E1 interface connected with the gNB-CU-UP and the F1-C interface connected with the gNB-DU.

gNB-CU-User Plane (gNB-CU-UP): a logical node hosting the user plane part of the PDCP protocol of the gNB-CU for an En-gNB, and the user plane part of the PDCP protocol and the SDAP protocol of the gNB-CU for a gNB. The gNB-CU-UP terminates the E1 interface connected with the gNB-CU-CP and the F1-U interface connected with the gNB-DU.

In accordance with 3GPP TS 38.401, the overall architecture for separation of gNB-CU-CP and gNB-CU-UP is based on the following principles:

a gNB may consist of a gNB-CU-CP, multiple gNB-CU-UPs and multiple gNB-DUs;

one gNB-DU is connected to only one gNB-CU-CP;

one gN-CU-UP is connected to only one gNB-CU-CP;

one gNB-DU can be connected to multiple gNB-CU-UPs under the control of the same gNB-CU-CP; and one gN-CU-UP can be connected to multiple DUs under the control of the same gNB-CU-CP.

However, it will be appreciated that for resiliency a gNB-DU and/or a gNB-CU-UP may be connected to multiple gNB-CU-CPs. The connectivity between a gNB-CU-UP and a gNB-DU is established by the gNB-CU-CP using Bearer Context Management functions. The gNB-CU-CP selects the appropriate gNB-CU-UP(s) for the requested services for the UE.

The general aspects and principles relating to the E1 interface (between the gNB-CU-CP and the gNB-CU-UP) are described in 3GPP TS 38.460 V1.0.0. The E1 interface supports various interface management relevant procedures, such as setup, configuration update, reset, release, error indication, and/or the like.

3GPP agreed that the information to be exchanged between gNB-CU-CP and gNB-CU-UP during E1 setup and configuration update includes the following:

gNB-CU-CP to gNB-CU-UP: gNB-CU-CP name; and
gNB-CU-UP to gNB-CU-CP: gNB-CU-UP ID; gNB-CU-UP Name; CN Support (EPC, 5GC or both); and supported PLMNs (PLMN ID, Slice Support List, NR CGI support list, QoS Parameters support List).

In case of a CP-UP split, in Bearer Context Setup or Bearer Context Modification procedure, the gNB-CU-CP configures the PDCP layer of gNB-CU-UP for appropriate header compression and security procedures. Specifically, header compression (i.e. Robust Header Compression (ROHC)) is specified using the 'PDCP Configuration' information element (IE), and security is configured using the 'Security information' IE.

SUMMARY OF INVENTION

However, the inventors have realised that the gNB (CU-UP entity) is not supposed to support all ROHC profiles, and all ciphering and integrity algorithms, which may potentially cause issues when the gNB-CU-CP is trying to configure the gNB-CU-UP with an ROHC profile or a security algorithm which is not supported by that gNB-CU-UP.

The present invention seeks to provide methods and associated apparatus that addresses or at least alleviates the above described problem.

One example aspect of the present invention provides a method performed by a central unit for control plane signalling (CU-CP) of a distributed base station apparatus, the method comprising: obtaining information indicating whether a security configuration is supported by a central unit for user plane signalling (CU-UP); and selecting a security configuration for a user equipment (UE) based on the obtained information.

One example aspect of the present invention provides a method performed by a central unit for user plane signalling (CU-UP) of a distributed base station apparatus, the method comprising: providing, to a central unit for control plane signalling (CU-CP), information indicating whether a security configuration is supported by the CU-UP.

One example aspect of the present invention provides a method performed by a central unit for user plane signalling (CU-UP) of a distributed base station apparatus, the method comprising: receiving, from a central unit for control plane signalling (CU-CP), information identifying at least one security configuration supported by a user equipment (UE); and selecting, based on the received information, a security configuration for the UE; and providing, to a central unit for control plane signalling (CU-CP), information identifying the selected security configuration.

One example aspect of the present invention provides a method performed by a central unit for control plane signalling (CU-CP) of a distributed base station apparatus, the method comprising: sending, to a central unit for user plane signalling (CU-UP), information identifying at least one security configuration supported by a user equipment (UE); and receiving, from the CU-UP, information identifying a security configuration selected for the UE.

Example aspects of the invention extend to corresponding systems, apparatus, and computer program products such as computer readable storage media having instructions stored thereon which are operable to program a programmable processor to carry out a method as described in the example aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently of (or in combination with) any other disclosed and/or illustrated features. In particular but without limitation the features of any of the claims dependent from a particular independent claim may be introduced into that independent claim in any combination or individually.

BRIEF DESCRIPTION OF DRAWINGS

Example embodiments of the invention will now be described, by way of example, with reference to the accompanying drawings in which.

DESCRIPTION OF EMBODIMENTS

Overview

Under the 3GPP standards, a NodeB (or an 'eNB' in LTE, 'gNB' in 5G) is a base station via which communication devices (user equipment or 'UE') connect to a core network and communicate to other communication devices or remote servers. Communication devices might be, for example, mobile communication devices such as mobile telephones, smartphones, smart watches, personal digital assistants, laptop/tablet computers, web browsers, e-book readers, and/or the like. Such mobile (or even generally stationary) devices are typically operated by a user (and hence they are often collectively referred to as user equipment, 'UE') although it is also possible to connect IoT devices and similar MTC devices to the network. For simplicity, the present application will use the term base station to refer to any such base stations and use the term mobile device or UE to refer to any such communication device.

Although for efficiency of understanding for those of skill in the art, the invention will be described in detail in the context of a 3GPP system (a 5G network), the principles of the invention can be applied to other systems in which slice scheduling is performed.

Figure 1:
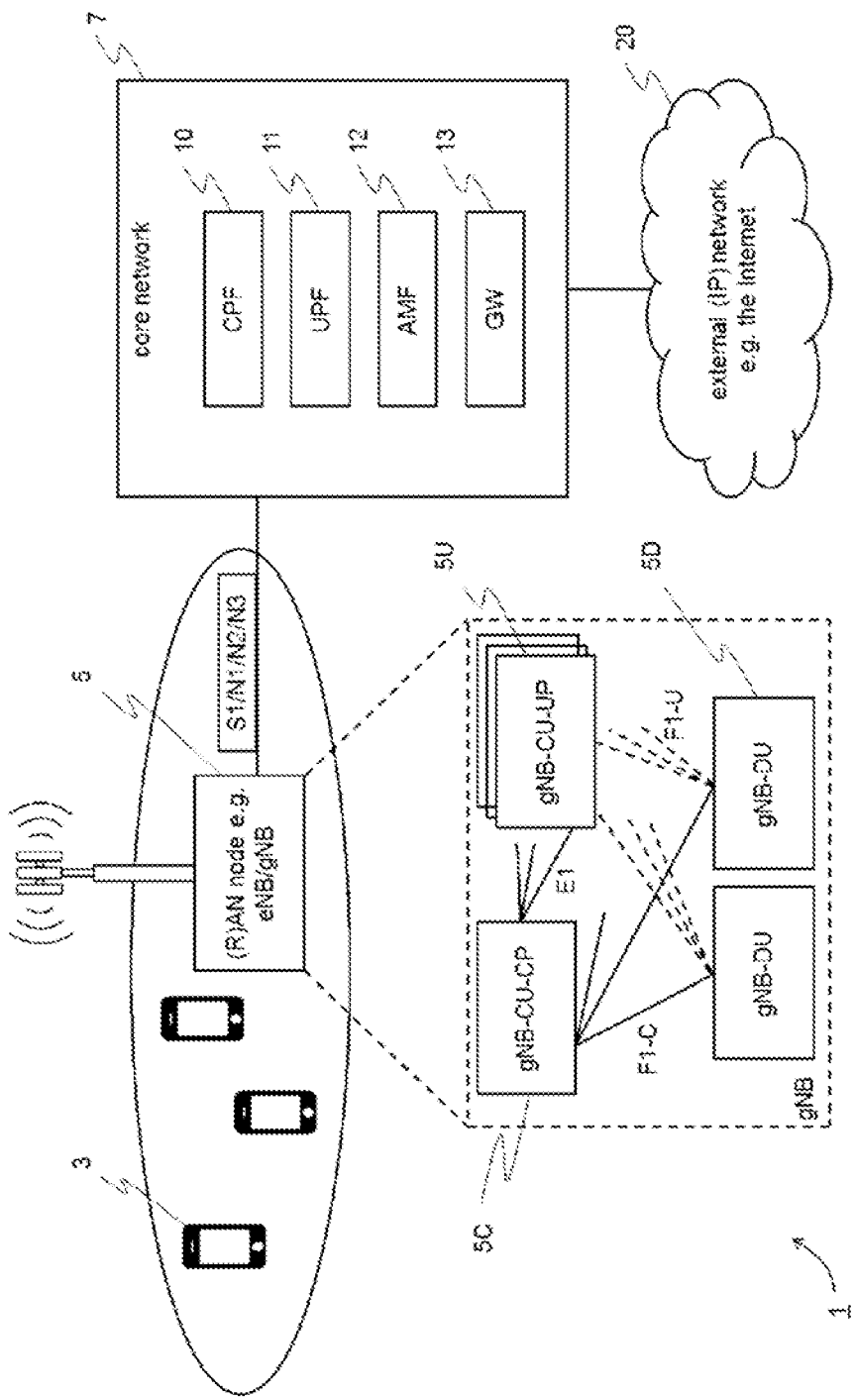
FIG. 1 illustrates schematically a mobile (cellular or wireless) telecommunication system to which example embodiments of the invention may be applied.

FIG. 1 illustrates schematically a mobile (cellular or wireless) telecommunication system 1 to which example embodiments of the invention may be applied.

In this network, users of mobile devices 3 (UEs) can communicate with each other and other users via respective base stations 5 and a core network 7 using an appropriate 3GPP radio access technology (RAT), for example, an E-UTRA and/or 5G RAT. It will be appreciated that a number of base stations 5 form a (radio) access network or (R)AN. As those skilled in the art will appreciate, whilst three mobile devices 3 and one base station 5 are shown in FIG. 1 for illustration purposes, the system, when implemented, will typically include other base stations and mobile devices (UEs).

A base station 5 that supports E-UTRA/4G protocols may be referred to as an 'eNB' and a base station 5 that supports NextGeneration/5G protocols may be referred to as a 'gNBs'. It will be appreciated that some base stations 5 may be configured to support both 4G and 5G, and/or any other 3GPP or non-3GPP communication protocols.

The base station 5 in FIG. 1 is configured to operate in accordance with next generation (5G) standards and, in this example, comprises a distributed gNB 5. The distributed gNB 5 of this example comprises a central unit for the control plane (gNB-CU-CP) 5C, at least one central unit for the user plane (gNB-CU-UP) 5U, and a plurality of distributed units (gNB-DU) 5D each serving at least one associated cell. It will be appreciated that some components of the distributed gNB 5 (e.g. the gNB-CU-CP 5C and/or at least one the gNB-CU-UP 5U function) may be provided in the core network 7, if appropriate. Although separate functions with specific names are described for illustrative purposes, the corresponding functionality may be implemented in isolation or combination by one or more suitable nodes implemented using dedicated circuitry and/or software instructions for controlling an associated processor.

It will be appreciated that whilst, in this example, a 'gNB' type base station is described, much of the functionality can be extended to other base stations (e.g. eNBs, ng-eNBs, En-gNBs, NG-RAN nodes) or similar apparatus for providing radio access to UEs 3 such as mobile (cellular) telephones/smartphones, MTC/IoT devices, and/or other mobile or fixed location communication devices. Although not shown in FIG. 1, the base station 5 may also control one or more associated cells either directly or via other nodes such as home base stations, relays, remote radio heads, and/or the like.

The various sub-units (functions) of the distributed gNB 5 are coupled via appropriate interfaces as follows: the gNB-CU-CP 5C is connected to the gNB-DU 5D through the F1-C interface; the gNB-CU-UP 5U is connected to the gNB-DU 5D through the F1-U interface; and the gNB-CU-UP 5U is connected to the gNB-CU-CP 5C through the E1 interface. The mobile device 3 and the base station 5 are connected via an appropriate air interface (for example the so-called 'Uu' interface and/or the like). Neighbouring base stations 5 are connected to each other via an appropriate base station to base station interface (such as the so-called 'Xn' interface, the 'X2' interface, and/or the like). The base station 5 is also connected to the core network nodes via an appropriate interface (such as the so-called 'S1', 'N1', 'N2', 'N3' interface, and/or the like).

The core network 7 (e.g. the EPC in case of LTE or the 5GC in case of NR/5G) typically includes logical nodes (or 'functions') for supporting communication in the telecommunication system 1, and for subscriber management, mobility management, charging, security, call/session management (amongst others). For example, the core network 7 of a 'Next Generation'/5G system will include, amongst other functions, control plane functions (CPFs) 10 and user plane functions (UPFs) 11. It will be appreciated that a CPF 10 may be configured to provide one or more of the following: an Access and Mobility Function (AMF) 12 (shown separately in FIG. 1), a Policy Control Function (PCF), an Operations and Maintenance (OAM) function, an Application Function (AF) and/or a Network Function (NF), amongst others. The core network 7 also comprises at least one gateway (GW) 13 (e.g. a serving gateway) for coupling the core network 7 to the RAN (base station 5) and to an external network 20 (typically an Internet Protocol (IP) network, such as the Internet).

Figure 2:
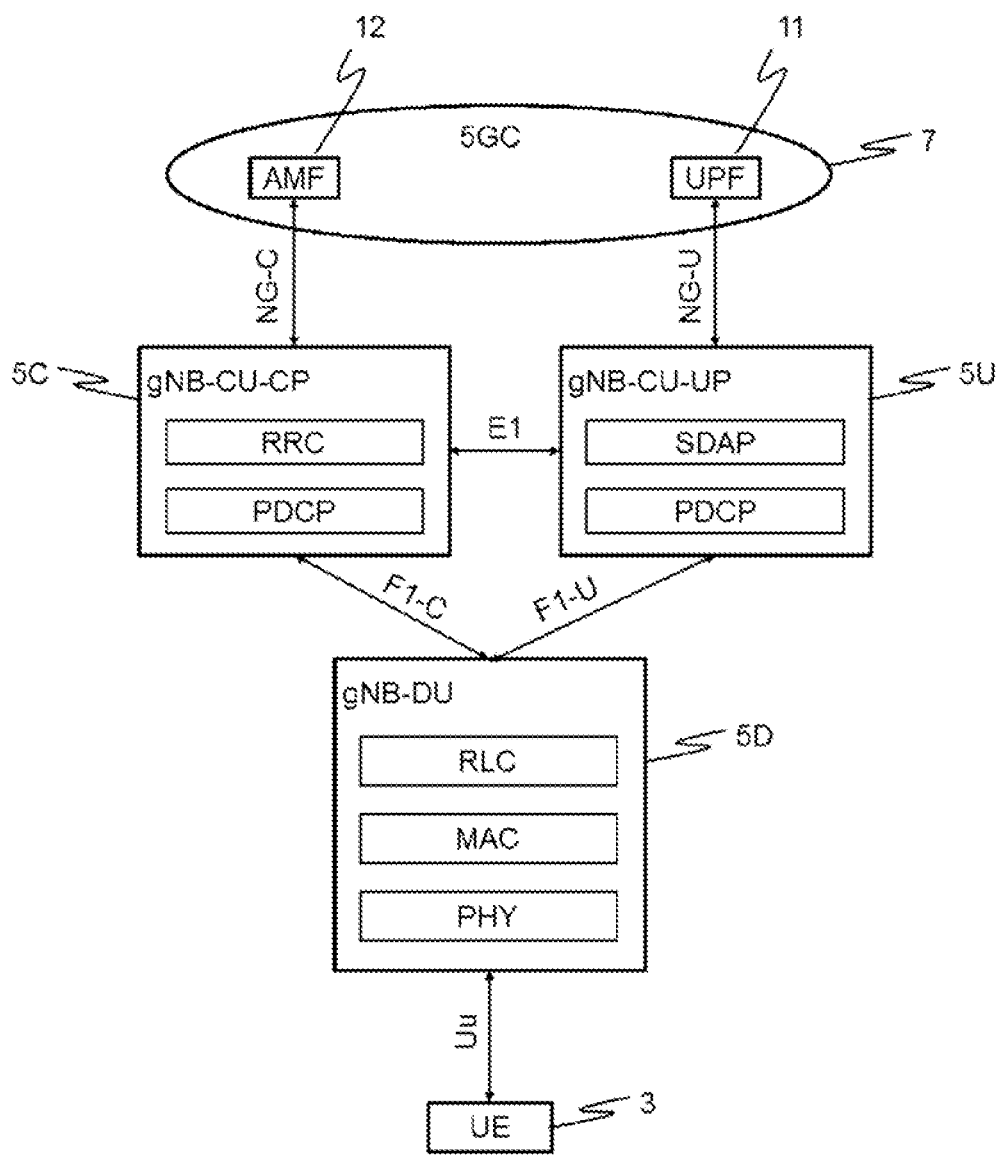
FIG. 2 illustrates schematically an exemplary way in which radio protocol distribution may be realised in the system shown in FIG. 1.
Figure 3:
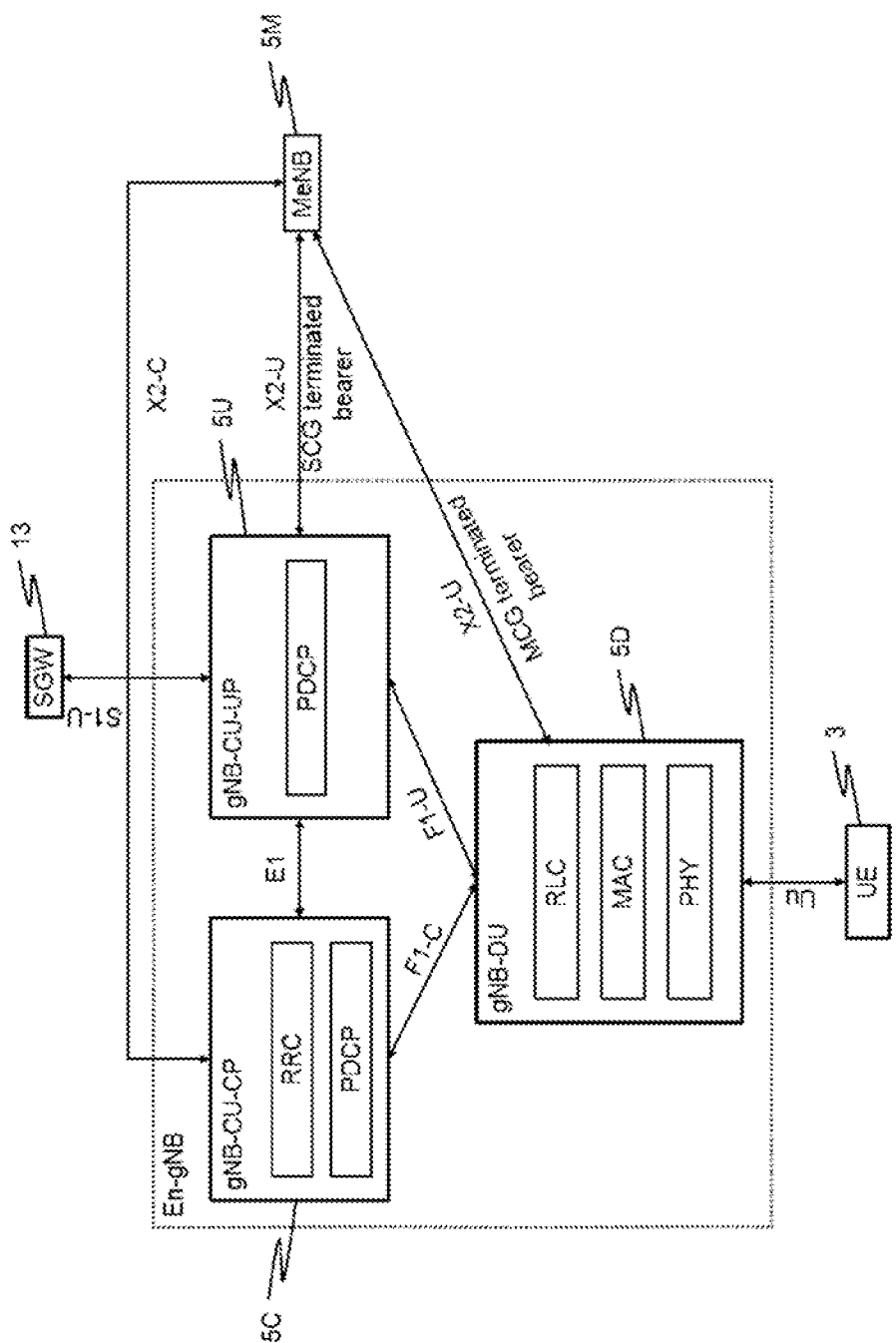
FIG. 3 illustrates schematically an exemplary way in which radio protocol distribution may be realised in the system shown in FIG. 1.

As illustrated in FIGS. 2 and 3, the gNB-DU 5D hosts the Radio Link Control (RLC), Medium Access Control (MAC), and Physical (PHY) layers of the distributed gNB 5, the gNB-CU-CP 5C hosts the RRC layer and the control plane part of the PDCP layer, and the gNB-CU-UP 5U hosts the user plane part of the Packet Data Convergence Protocol (PDCP) layer and the Service Data Adaptation Protocol (SDAP) layer for a gNB 5 (FIG. 2) or the user plane part of the PDCP layer for an En-gNB (FIG. 3).

When the base station 5 comprises a distributed gNB, as shown in FIG. 2, the gNB-CU-CP 5C is connected to the AMF 13 in the core network 7 via an appropriate control plane interface and the gNB-CU-UP 5U is connected to the UPF 11 in the core network 7 via an appropriate user plane interface.

When the base station 5 comprises a distributed En-gNB, as shown in FIG. 3, the gNB-CU-CP 5C and the gNB-CU-UP 5U are connected to a master base station (MeNB) 5M via the X2 interface, for the control plane and the user plane, respectively. Although not show in FIG. 3, the MeNB 5M is also connected to the core network 7. The gNB-CU-UP 5U is also connected to a serving gateway (SGW) 13 via the S1 interface for communicating user plane data between the base station 5 and the core network 7 (and other nodes connected to the core network 7, e.g. via the external network 20).

Beneficially, the components of this system 1 are configured to set up an appropriate ROHC profile and an appropriate security algorithm for the UE 3 which is also supported by the base station 5 (i.e. the gNB-CU-UP 5U part thereof that serves the UE 3).

In a first option, when the gNB-CU-CP 5C requests the gNB-CU-UP 5U to set up an initial bearer context for the UE (by sending e.g. a 'Bearer Context Setup Request' or a 'Bearer Context Modification Request' to the gNB-CU-UP 5U), the request includes information identifying the security algorithm and the ROHC profile selected by the gNB-CU-CP 5C for the UE 3.

Since the gNB-CU-UP 5U may not support all ROHC profiles and all ciphering and integrity protection algorithms and all ROHC profiles, in this example, the gNB-CU-UP 5U is configured to reject the request from the gNB-CU-CP 5C if it cannot activate user plane confidentiality and/or user plane integrity protection according to the received security configuration or if it does not support the selected ROHC profile. Specifically, the gNB-CU-UP 5U may be configured to respond to the gNB-CU-CP 5C with an appropriately formatted message (e.g. a 'Bearer Context Setup Failure' message) and include an appropriate cause value in the response. This will beneficially allow the gNB-CU-CP 5C to select a different security configuration or ROHC profile or to select a different gNB-CU-UP 5U and re-send the request for the UE initial bearer context with the newly selected security configuration/ROHC profile (e.g. to the same gNB-CU-UP 5U) or to re-send the request to a different gNB-CU-UP 5U (e.g. with the originally selected security configuration/ROHC profile).

In a second option, the gNB-CU-UP 5U may be configured to inform the gNB-CU-CP 5C of its PDCP capability during E1 interface setup procedure. Specifically, the gNB-CU-UP 5U may be configured to provide information identifying one or more of the following: at least one ciphering algorithm supported (or preferred) by the gNB-CU-UP 5U; at least one integrity algorithm supported (or preferred) by the gNB-CU-UP 5U; and at least one ROHC profile supported (or preferred) by the gNB-CU-UP 5U.

The gNB-CU-CP 5C may be configured to take the above information into account for bearer context setup and modification involving the gNB-CU-UP 5U. For example, when performing the initial context setup for the UE (step S4 of FIG. 7), the gNB-CU-CP 5C may be configured to select an appropriate configuration which is supported by gNB-CU-UP 5U. Alternatively, the gNB-CU-CP 5C may be configured to select an appropriate gNB-CU-UP 5U which can support the corresponding algorithms/profiles to be configured for the UE 3.

In a third option, the gNB-CU-UP 5U may configure its PDCP layer by itself (e.g. based on information provided by the gNB-CU-CP 5C), by selecting an appropriate security configuration/ROHC profile supported by both the gNB-CU-UP 5U and the UE 3. In order to do so, the gNB-CU-UP 5U in this example is configured to obtain information identifying UE security capability and UE ROHC capability. Using the obtained information, the gNB-CU-UP 5U provides the appropriate UE configuration for the PDCP layer and the SDAP layer (e.g. via the gNB-CU-CP 5C).

In a fourth option, the capability of a particular gNB-CU-UP 5U may be transferred to the gNB-CU-CP 5C via the UPF 11, a Session Management Function (SMF), and the AMF 12, or via an Operations and Maintenance (OAM) node. Once the gNB-CU-CP 5C is aware of the capabilities (supported security/ciphering algorithms and ROHC profiles) of the gNB-CU-UP 5U, the gNB-CU-CP 5C can beneficially avoid selecting a security/ciphering algorithm or ROHC profile for the UE 3 that is not supported by the gNB-CU-UP 5U, or alternatively, select a gNB-CU-UP 5U that supports the selected security/ciphering algorithm and ROHC profile.

In a fifth option, information identifying the capabilities of a particular gNB-CU-UP may be transferred between gNB-CU-CPs 5C (e.g. during a handover; an Evolved Universal Terrestrial Radio Access-New Radio-Dual Connectivity (EN-DC) X2 Setup procedure; an Xn Setup procedure; a Configuration Update procedure; and/or the like). This option will also beneficially allow the gNB-CU-CP 5C to select an appropriate security/ciphering algorithm and ROHC profile for the UE 3 that are supported by the gNB-CU-UP 5U, or alternatively, select a gNB-CU-UP 5U that supports the security/ciphering algorithm and ROHC profile selected for the UE 3.

User Equipment (UE)

Figure 4:
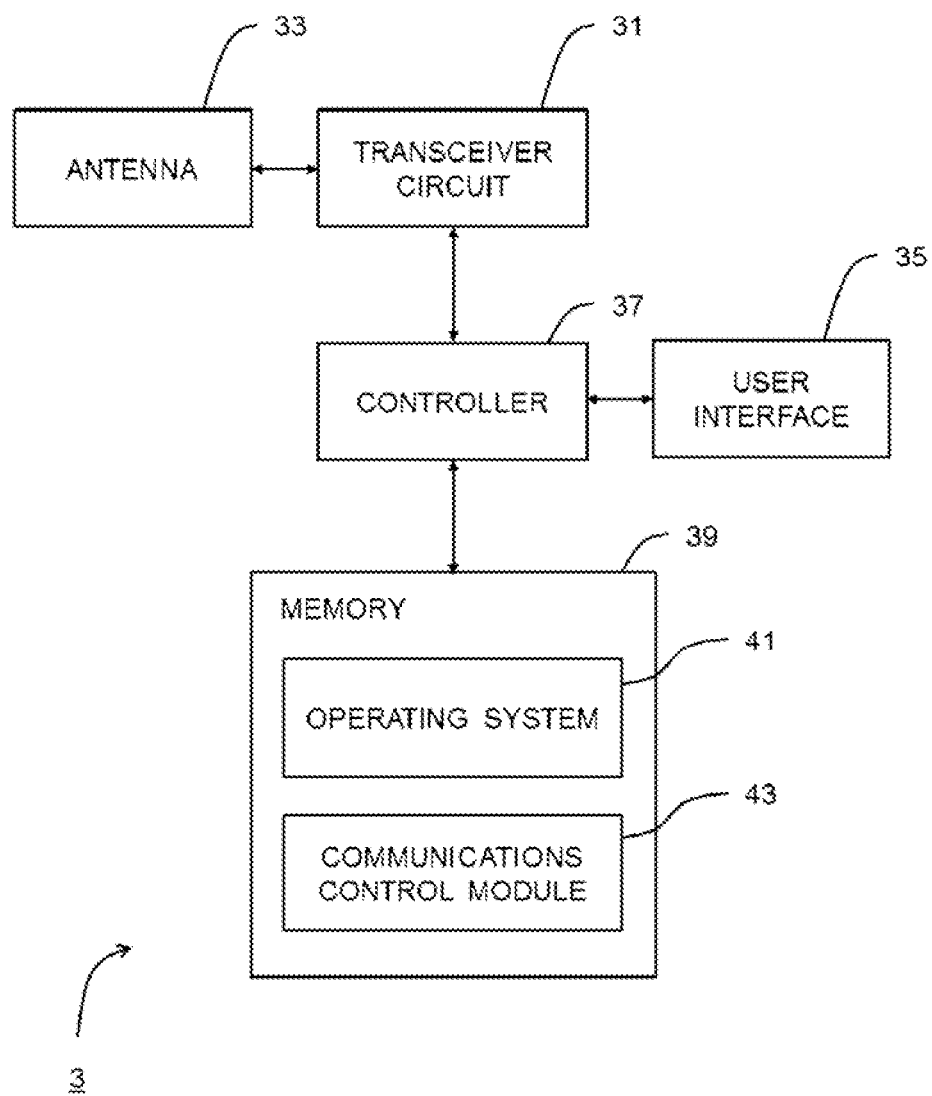
FIG. 4 is a schematic block diagram of a mobile device (user equipment) forming part of the system shown in FIG. 1.

FIG. 4 is a block diagram illustrating the main components of the mobile device (UE) 3 shown in FIG. 1. As shown, the UE 3 includes a transceiver circuit 31 which is operable to transmit signals to and to receive signals from the connected node(s) via one or more antenna 33. Although not necessarily shown in FIG. 4, the UE 3 will of course have all the usual functionality of a conventional mobile device (such as a user interface 35) and this may be provided by any one or any combination of hardware, software and firmware, as appropriate. A controller 37 controls the operation of the UE 3 in accordance with software stored in a memory 39. The software may be pre-installed in the memory 39 and/or may be downloaded via the telecommunication network 1 or from a removable data storage device (RMD), for example. The software includes, among other things, an operating system 41, and at least a communications control module 43. The communications control module 43 is responsible for handling (generating/sending/receiving) signalling messages and uplink/downlink data packets between the UE 3 and other nodes, including (R)AN nodes 5 and core network nodes.

Base Station

Figure 5:
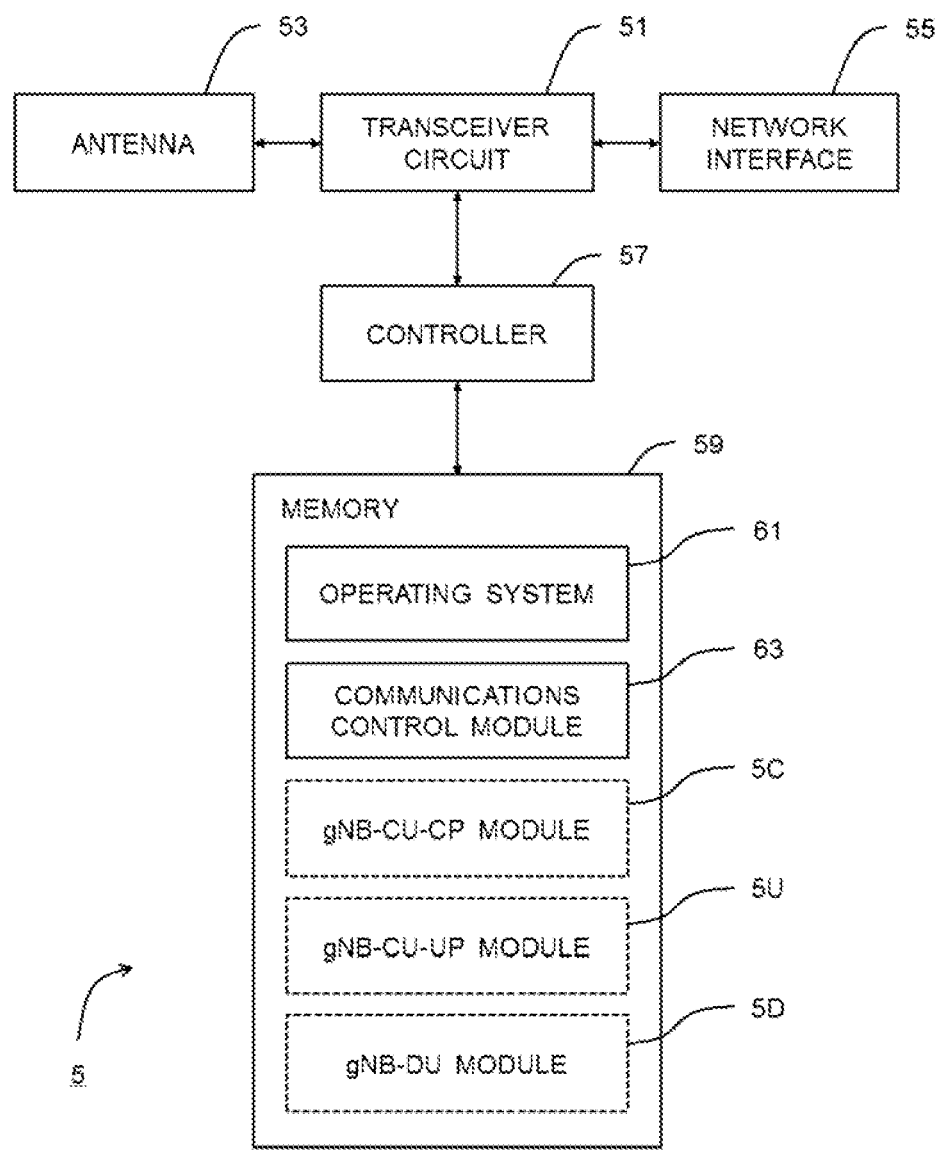
FIG. 5 is a schematic block diagram of a base station apparatus forming part of the system shown in FIG. 1.

FIG. 5 is a block diagram illustrating the main components of the base station apparatus 5 shown in FIG. 1. As shown, the base station 5 includes a transceiver circuit 51 which is operable to transmit signals to and to receive signals from connected UE(s) 3 via one or more antenna 53 and to transmit signals to and to receive signals from other network nodes (either directly or indirectly) via a network interface 55. The network interface 55 typically includes an appropriate base station-base station interface (such as X2/Xn) and an appropriate base station-core network interface (such as S1/N1/N2/N3).

A controller 57 controls the operation of the base station 5 in accordance with software stored in a memory 59. The software may be pre-installed in the memory 59 and/or may be downloaded via the telecommunication network 1 or from a removable data storage device (RMD), for example. The software includes, among other things, an operating system 61, and at least a communications control module 63.

The communications control module 63 is responsible for handling (generating/sending/receiving) signalling between the base station 5 and other nodes, such as the UE 3 and the core network nodes.

When the base station 5 comprises a distributed gNB or En-gNB, the network interface 55 also includes an E1 interface and an F1 interface (F1-C for the control plane and F1-U for the user plane) to communicate signals between respective functions of the distributed gNB or En-gNB. In this case, the software also includes at least one of: a gNB-CU-CP module 5C, a gNB-CU-UP module 5U, and a gNB-DU module 5D. If present, the gNB-CU-CP module 5C hosts the RRC layer and the control plane part of the PDCP layer of the distributed gNB or En-gNB. If present, the gNB-CU-UP module 5U hosts the user plane part of the PDCP and the SDAP layers of the distributed gNB or the user plane part of the PDCP layer of the distributed En-gNB. If present, the gNB-DU module 5D hosts the RLC, MAC, and PHY layers of the distributed gNB or En-gNB.

Core Network Node

Figure 6:
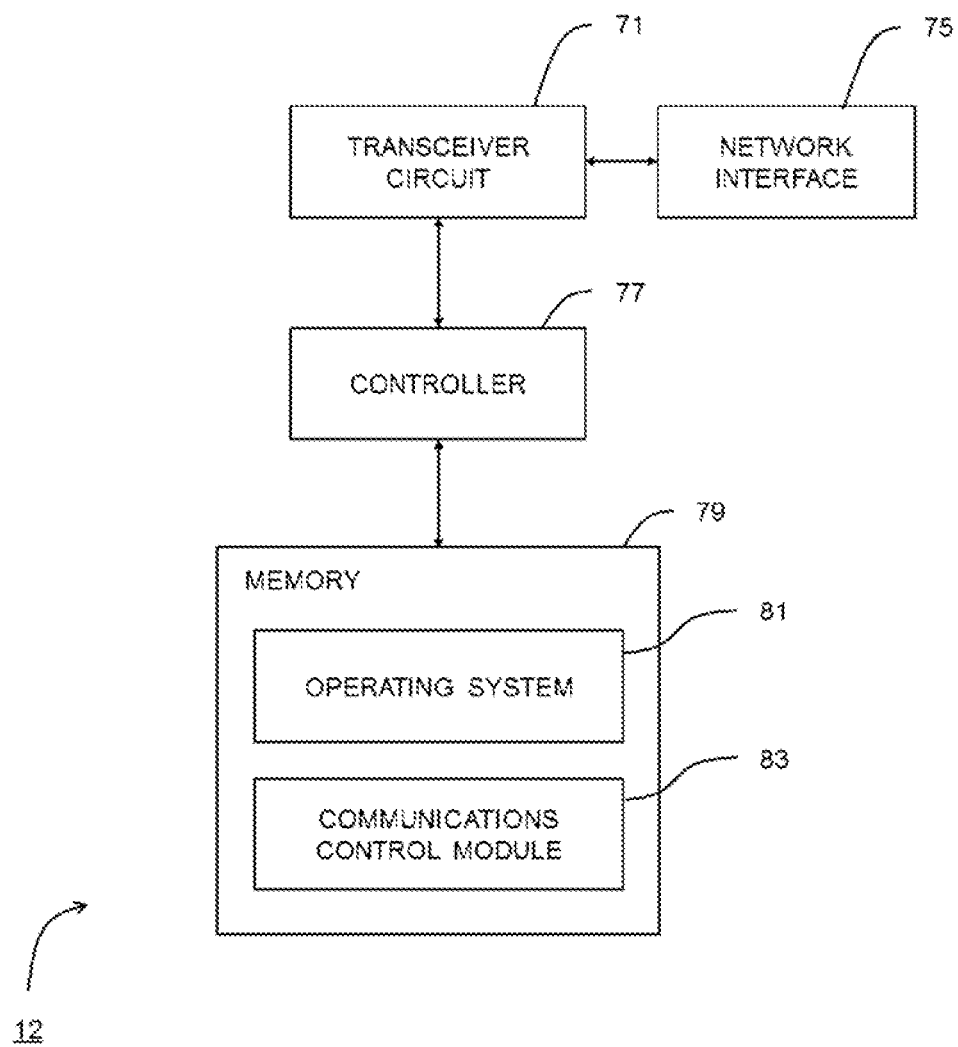
FIG. 6 is a schematic block diagram of a core network node forming part of the system shown in FIG. 1.

FIG. 6 is a block diagram illustrating the main components of an exemplary core network node, such as the AMF 12 shown in FIG. 1. As shown, the AMF 12 includes a transceiver circuit 71 which is operable to transmit signals to and to receive signals from other nodes (including the UE 3, the base station 5, and other core network nodes) via a network interface 75. A controller 77 controls the operation of the AMF 12 in accordance with software stored in a memory 79. The software may be pre-installed in the memory 79 and/or may be downloaded via the telecommunication network 1 or from a removable data storage device (RMD), for example. The software includes, among other things, an operating system 81, and at least a communications control module 83.

The communications control module 83 is responsible for handling (generating/sending/receiving) signaling between the AMF 12 and other nodes, such as the UE 3, the base station 5, and other core network nodes.

In the above description, the mobile telephone, the UE, the base station, and core network node are described for ease of understanding as having a number of discrete modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

A number of procedures will now be described, by way of example only, which may be implemented to help selecting an appropriate security/ciphering algorithm and ROHC profile for the UE 3 which is supported by the associated gNB-CU-UP 5U (or selecting a gNB-CU-UP 5U that supports the UE's security/ciphering algorithm and ROHC profile). It will be appreciated that whilst each of these procedures may provide technical benefits independently when implemented in isolation, any combination of these procedures may be implemented together.

DETAILED DESCRIPTION

A more detailed description of some exemplary embodiments is provided below with reference to FIGS. 7 to 10. Specifically, the following examples may be applicable to a scenario where the gNB-CU-CP 5C part of a distributed base station 5 is not aware of the algorithms supported by the gNB-CU-UP 5U part.

In accordance with current 3GPP requirements, the distributed base station 5 (i.e. the gNB-CU-UP 5U entity thereof) is not supposed to support all ROHC profiles, all ciphering and integrity algorithms.

Specifically, 3GPP TS 33.501 V15.0.0 sub-clause 5.11.1.1 states that the gNB is required to implement the following ciphering algorithms: NEA0 (a 'Null' ciphering algorithm, i.e. no protection), 128-NEA1 (which is a 128-bit SNOW 3G based algorithm), and 128-NEA2 (which is a 128-bit AES based algorithm). In addition, the gNB may also implement the 128-NEA3 ciphering algorithm (which is a 128-bit ZUC based algorithm).

Regarding integrity protection, 3GPP TS 33.501 sub-clause 5.11.1.2 states that the gNB is required to support the NIA0 (Null Integrity Protection algorithm, i.e. no integrity protection), the 128-NIA1 (128-bit SNOW 3G based), and the 128-NIA2 (128-bit AES based) integrity protection algorithms. In addition, the gNB may also support the 128-NIA3 (a 128-bit ZUC based) integrity protection algorithm.

Each encryption algorithm and each integrity algorithm may be assigned an appropriate unique identifier (e.g. a respective 4-bit identifier).

Figure 7:
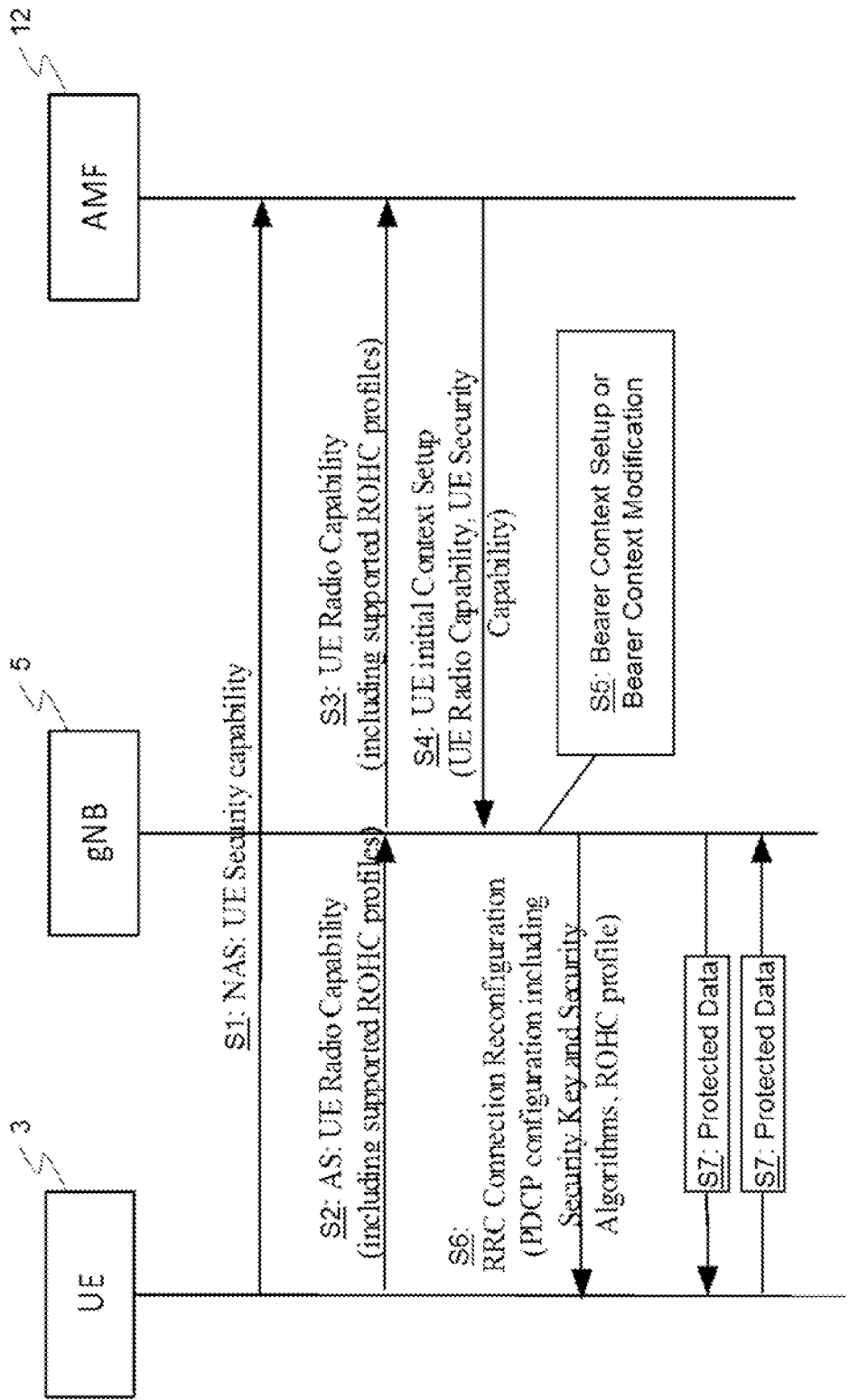
FIG. 7 illustrates schematically an exemplary way in which example embodiments of the present invention may be implemented in the system shown in FIG. 1.

FIG. 7 illustrates schematically an exemplary procedure for UE PDCP layer related capability report and usage. It will be appreciated that the procedure may include additional steps which are omitted for brevity. Whilst FIG. 7 illustrates the relevant data protection aspects, it will be appreciated that the procedure may also require appropriate RRC signalling protection (also omitted).

As generally illustrated in steps S1 to S3, the UE 3 informs the AMF 12 in the core network 7 about its security capability and its radio capability (including its supported ROHC profiles). In step S4, the AMF 12 informs the base station about the UE's 3 security and radio capability and instructs the base station 5 to set up an initial context for the UE 3. In response to this, as generally shown in step S5, the base station 5 performs an appropriate Bearer Context Setup procedure (or a Bearer Context Modification procedure if the base station 5 already has a bearer context configured for the UE 3) before performing an RRC Connection Reconfiguration procedure with the UE 3 (in step S6) and communicating protected data for the UE 3 (in step S7).

In more detail, in case of a control plane-user plane (CP-UP) split, the components of the distributed base station 5 perform the Bearer Context Setup (or Modification) procedure in order to configure appropriate header compression and security procedures for the UE 3. Specifically, the gNB-CU-CP 5C configures the PDCP layer of gNB-CU-UP 5U for appropriate header compression and security procedures. Header compression (ROHC) is specified using the 'PDCP Configuration' IE (see Table 1), and security is configured using the 'Security Information' IE (see Table 2).

TABLE 1

Table 1 - PDCP Configuration IE

| IE/Group Name | Presence | Range | IE type and reference | Semantics description |
|---|---|---|---|---|
| POCP SN Size | M | | ENUMERATED (12, 18, . . .) | Indicates the POCP SN size in bits. For more information see PDCP-Config IE in TS 38.331. |
| RLC mode | M | | ENUMERATED (TM, UM, AM, . . .) | Indicates the RLC mode for the DRB. For more information see POCP-Config IE in TS 38.331. |
| ROHC Parameters | O | | 9.3.1.40 | |
| T-Reordering Timer | O | | 9.3.1.41 | |
| Discard Timer | O | | 9.3.1.42 | |
| UL Data Split Threshold | O | | 9.3.1.43 | |
| PDCP Duplication | O | | ENUMERATED (True, . . .) | Indicates whether PDCP duplication is to be configured for the DRB. |

TABLE 2

Table 2 - Security Information IE:
configuring UP ciphering and/or integrity protection

| IE/Group Name | Presence | Range | IE type and reference | Semantics description |
|---|---|---|---|---|
| Security Algorithm | M | | 8.3.1.31 | |
| User Plane Security Keys | M | | 9.3.1.32 | |

Since the gNB-CU-UP 5U does not need to support all ROHC profiles, and it does not need to support all ciphering and integrity algorithms, the gNB-CU-UP 5U and the gNB-CU-CP 5C are configured to select an ROHC profile and a ciphering and integrity algorithm which is supported by both the UE 3 and the base station 5 (via at least one gNB-CU-UP 5U thereof).

Figure 8:
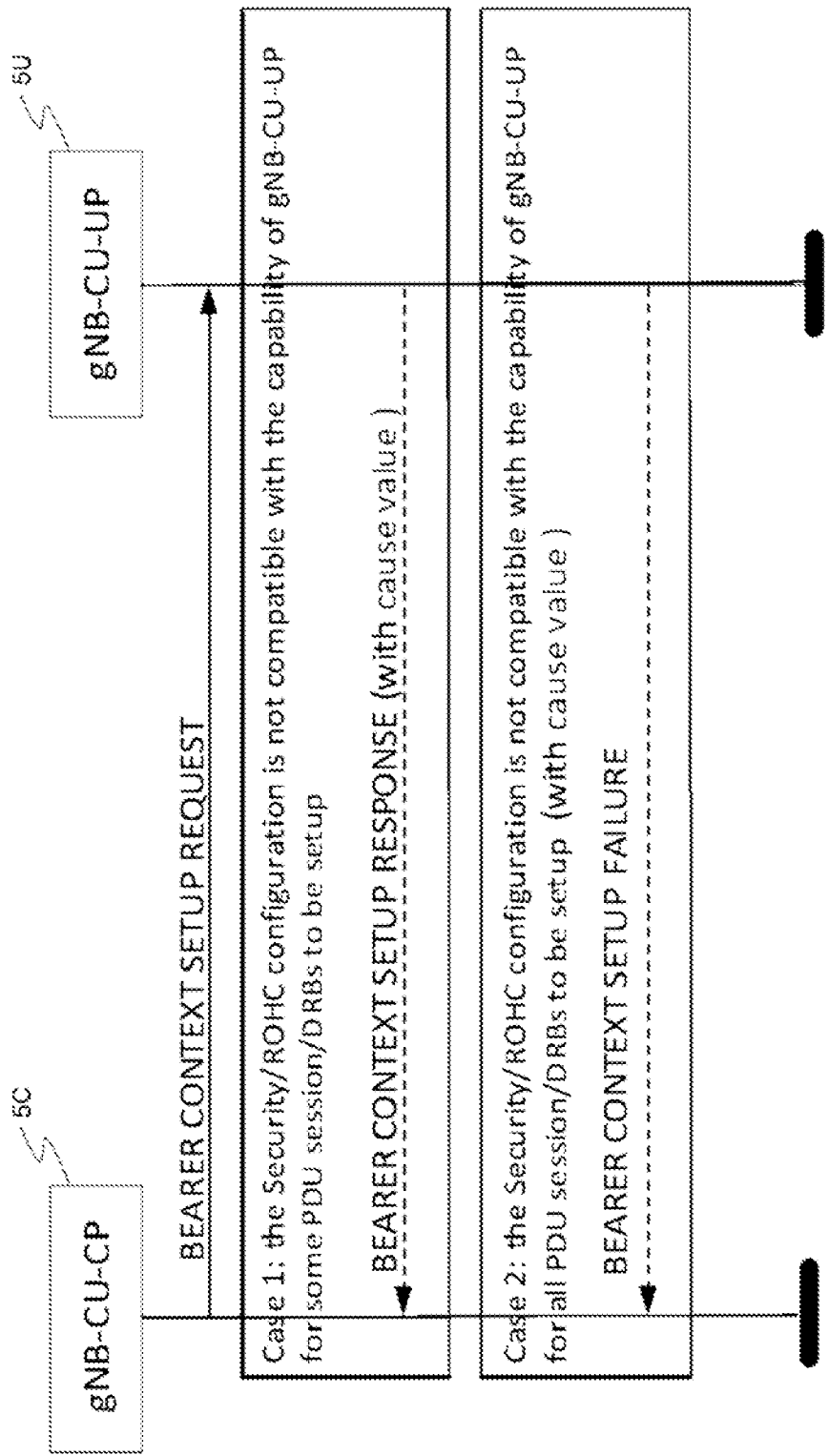
FIG. 8 illustrates schematically an exemplary way in which example embodiments of the present invention may be implemented in the system shown in FIG. 1.
Figure 9:
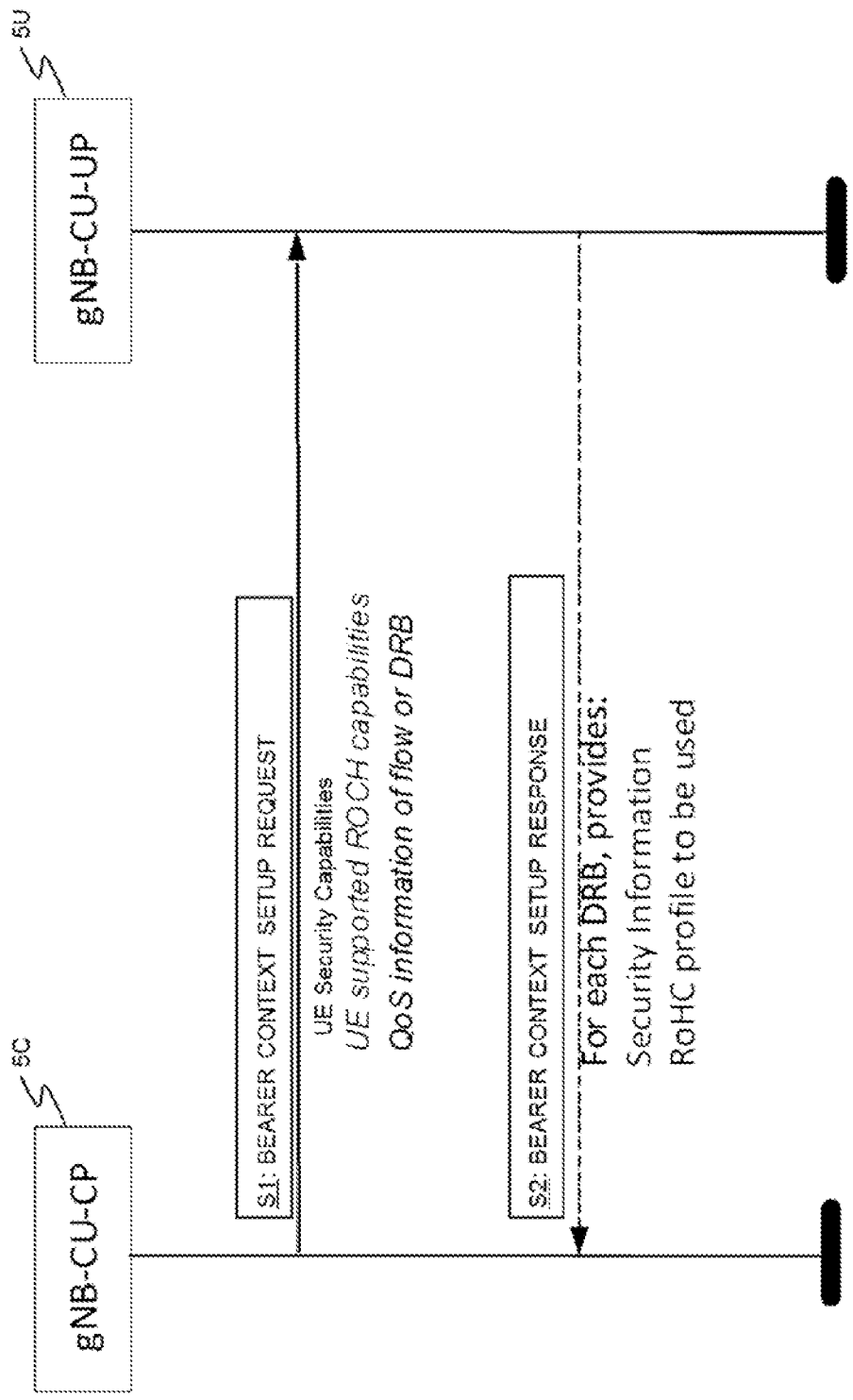
FIG. 9 illustrates schematically an exemplary way in which example embodiments of the present invention may be implemented in the system shown in FIG. 1.

Some exemplary ways in which these procedures may be carried out are described in detail below and are also illustrated in FIGS. 8 and 9.

As shown in FIG. 8, the gNB-CU-CP 5C requests the gNB-CU-UP 5U to establish user plane resources for at least one Protocol Data Unit (PDU) session/Data Radio Bearers (DRBs) for the UE 3, by generating and sending an appropriately formatted Bearer Context Setup Request message. The Bearer Context Setup Request includes appropriate information identifying the ROHC profile and the ciphering and integrity algorithm selected for the UE 3 (by taking into account the capabilities of the UE 3 indicated by the AMF 12 in step S4 of FIG. 7).

Upon receipt of the Bearer Context Setup Request, the gNB-CU-UP 5U checks whether the ROHC profile and the ciphering and integrity algorithm indicated in the Bearer Context Setup Request are supported by the gNB-CU-UP 5U. If they are supported, the gNB-CU-UP 5U proceeds with the request (e.g. performs step S6 of FIG. 7) and returns an appropriate response to the gNB-CU-CP 5C (e.g. a Bearer Context Setup Response including information indicating that the bearer context has been successfully set up).

However, if at least one of the ROHC profile and the ciphering and integrity algorithm indicated in the Bearer Context Setup Request is not supported by the gNB-CU-UP 5U, the gNB-CU-UP 5U is configured to provide appropriate assistance information to the gNB-CU-CP 5C for selecting a different ROHC profile and/or ciphering and integrity algorithm for the UE 3.

In a first option, the gNB-CU-UP 5U may be configured to reject establishment of user plane resources for the requested Protocol Data Unit (PDU) session/Data Radio Bearers (DRBs) if it cannot activate user plane confidentiality and/or user plane integrity protection according to the received security configuration.

For example, the gNB-CU-UP 5U may be configured to respond to the gNB-CU-CP 5C with an appropriately formatted message (e.g. a 'Bearer Context Setup Failure' message) and include an appropriate cause value in the response. For example, one or more of the following cause values may be used: 'encryption protection algorithm not supported'; 'integrity protection algorithm not supported'; 'ROHC profile not supported' (see the 'Radio Network Layer Cause' IE in Table 3 below).

In another example, e.g. if only some (at least one) of the requested PDU sessions or some (at least one) DRBs cannot be setup by the gNB-CU-UP 5U, then the gNB-CU-UP 5U may be configured to respond with an appropriately formatted Bearer Context Setup Response including information (e.g. a list) identifying any PDU session/DRB that failed to setup. The Bearer Context Setup Response may include one or more of the cause values shown in the 'Radio Network Layer Cause' IE of Table 3 (e.g. 'encryption protection algorithm not supported'; 'integrity protection algorithm not supported'; 'ROHC profile not supported').

TABLE 3

Table 3 - configuring UP ciphering and/or integrity protection

| IE/Group Name | Presence | Range | IE Type and Reference |
|---|---|---|---|
| CHOICE Cause Group | M | | |
| >Radio Network Layer | | | |
| >>Radio Network Layer Cause | M | | ENUMERATED (Unspecified, Unknown or already allocated gNB-CU-CP UE E1AP ID. Unknown or already allocated gNB-CU-UP UE E1AP ID, Unknown or inconsistent pair of UE E1AP ID, Interaction with other procedure, POCP Count Wrap Around, Encryption protection algorithms not supported, integrity protection algorithms not supported. ROHC profile not supported . . .) |
| >Transport Layer | | | . . . |
| >>Transport Layer Cause | M | | |
| >Protocol | | | . . . |
| >>Protocol Cause | | | |
| >Misc | | | . . . |
| >Miscellaneous Cause | M | | |

In a second option, the gNB-CU-UP 5U may be configured to inform the gNB-CU-CP 5C of its PDCP capability during E1 interface setup procedure. Specifically, the gNB-CU-UP 5U may be configured to provide information identifying one or more of the following: at least one ciphering algorithm supported (or preferred) by the gNB-CU-UP 5U; at least one integrity algorithm supported (or preferred) by the gNB-CU-UP 5U; and at least one ROHC profile supported (or preferred) by the gNB-CU-UP 5U.

The gNB-CU-CP 5C may be configured to take the above information into account for bearer context setup and modification involving the gNB-CU-UP 5U. For example, when performing the initial context setup for the UE (step S4 of FIG. 7), the gNB-CU-CP 5C may be configured to select an appropriate configuration which is supported by gNB-CU-UP 5U. Alternatively, the gNB-CU-CP 5C may be configured to select an appropriate gNB-CU-UP 5U which can support the corresponding algorithms/profiles to be configured for the UE 3.

It will be appreciated that in order to support the above described second option, the E1 setup procedure/the E1 configuration update procedure need to include information identifying any security capabilities and ROHC profiles supported by the gNB-CU-UP 5U (direction: gNB-CU-UP→gNB-CU-CP). Some exemplary information elements that may be used in the E1 setup procedure/E1 configuration update procedure are illustrated in Tables 4 to 6 below. It will be appreciated that the SDAP capability of the gNB-CU-UP 5U may also be exchanged over the E1 interface in the same way, if appropriate.

TABLE 4

Table 4 - information elements for E1 setup/E1 configuration update procedure

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU-UP ID | M | | 9.3.1.15 | | YES | reject |
| qNB-CU-UP Name | | | PrintableString (SIZE(1.. 150, ...)) | Human readable name of the gNB-CU-UP. | YES | ignore |
| CN Support | M | | ENUMERATED (EPC. 5GC, both, ...) | | YES | reject |
| Security Capabilities | | | See Table 6 | | — | — |
| Supported ROHC profiles | O | | See Table 5 | | — | — |
| Supported PLMNS | | 1.. <maxnoof SPLMNSX | | Supported PLMNs | EACH | Reject |
| >PLMN Identity | M | | 9.3.1.7 | | | |
| >Slice Support List | O | | Slice Support List 9.3.1.8 | Supported S-NSSAIS, | — | — |
| >NR CGI Support List | O | | 9.3.1.36 | Supported cells. | — | — |
| >QoS Parameters Support List | O | | 9.3.1.37 | Supported QoS parameters. | — | — |

TABLE 5

Table 5 - Supported ROHC profiles (in the CU-UP)

| IE/Group Name | Presence | Range | IE type and reference | Semantics description |
|---|---|---|---|---|
| Supported ROHC profiles | M | | BIT STRING (SIZE(16, . . .)) | Each position in the bitmap represents an ROHC profiles: "first bit" - profile0x0000, "second bit" - profile0x0001, "third bit" - profile0x0002, Leftover bits reserved for future use. Value '1' indicates support and value '0' indicates no support of the profile. Algorithms are defined in x. |

TABLE 6

Table 6 - Security Capabilities (supported algorithms for encryption and integrity protection in the CU-UP)

| IE/Group Name | Presence | Range | IE type and reference | Semantics description |
|---|---|---|---|---|
| NR Encryption Algorithms | M | | BIT STRING (SIZE(16, . . .)) | Each position in the bitmap represents an encryption algorithm: "all bits equal to 0" - UE supports no other algorithm than NEA0, "first bit" - 128-NEA1. "second bit" - 128-NEA2, "third bit" - 128-NEA3, |

TABLE 6-continued

Table 6 - Security Capabilities
(supported algorithms for encryption and integrity protection in the CU-UP)

| IE/Group Name | Presence | Range | IE type and reference | Semantics description |
|---|---|---|---|---|
| NR Integrity Protection Algorithms | M | | BIT STRING (SIZE(16, . . .)) | other bits reserved for future use. Value '1' indicates support and value '0' indicates no support of the algorithm. Algorithms are defined in TS 33.501 [13]. Each position in the bitmap represents an integrity protection algorithm: "all bits equal to 0" - UE supports no other algorithm than NIA0, "first bit" - 128-NIA1, "second bit" - 128-NIA2, "third bit" - 128-NIA3, other bits reserved for future use. Value '1' indicates support and value '0' indicates no support of the algorithm. Algorithms are defined in TS 33.501 [13]. |

In a third option, instead of the gNB-CU-CP 5C providing PDCP configuration for the gNB-CU-UP 5U, the gNB-CU-UP 5U may configure its PDCP layer by itself (e.g. based on information provided by the gNB-CU-CP 5C).

In more detail, in order for the gNB-CU-UP 5U to be able to determine a suitable configuration (supported by both the UE 3 and the gNB-CU-UP 5U), the gNB-CU-UP 5U needs to obtain the following UE/bearer information: UE security capability and UE ROHC capability. Optionally, the gNB-CU-UP 5U may also obtain the flow level or DRB level QoS requirements associated with the UE 3.

Using the obtained information, the gNB-CU-UP 5U may be configured to provide the appropriate UE configuration for the PDCP layer and the SDAP layer via the gNB-CU-CP 5C.

Further details of the third option are illustrated in FIG. 9. As can be seen, in this example, the gNB-CU-CP 5C generates and sends, in step S1, an appropriately formatted message (e.g. a 'Bearer Context Setup Request' message) to the gNB-CU-UP 5U. The message includes (e.g. in appropriately formatted information elements) information identifying the security capabilities and ROHC capabilities of the UE 3 for which the procedure has been initiated. The message may also include information identifying the associated flow level or DRB level QoS.

Once the gNB-CU-UP 5U receives the message from the gNB-CU-CP 5C, it proceeds to determine a suitable security algorithm and a suitable ROHC profile for the UE (based on the information included in the message received in step S1). If there are more than one DRB, the security algorithm and ROHC profile may be different for different DRBs (e.g. depending on the flow level or DRB level QoS for that DRB, if available).

Next, the gNB-CU-UP 5U generates and sends, in step S2, an appropriately formatted message (e.g. a 'Bearer Context Setup Response') to the gNB-CU-CP 5C. The message includes information identifying the security information and ROHC profile to be used for the UE 3 (e.g. in appropriately formatted information elements).

Figure 10:
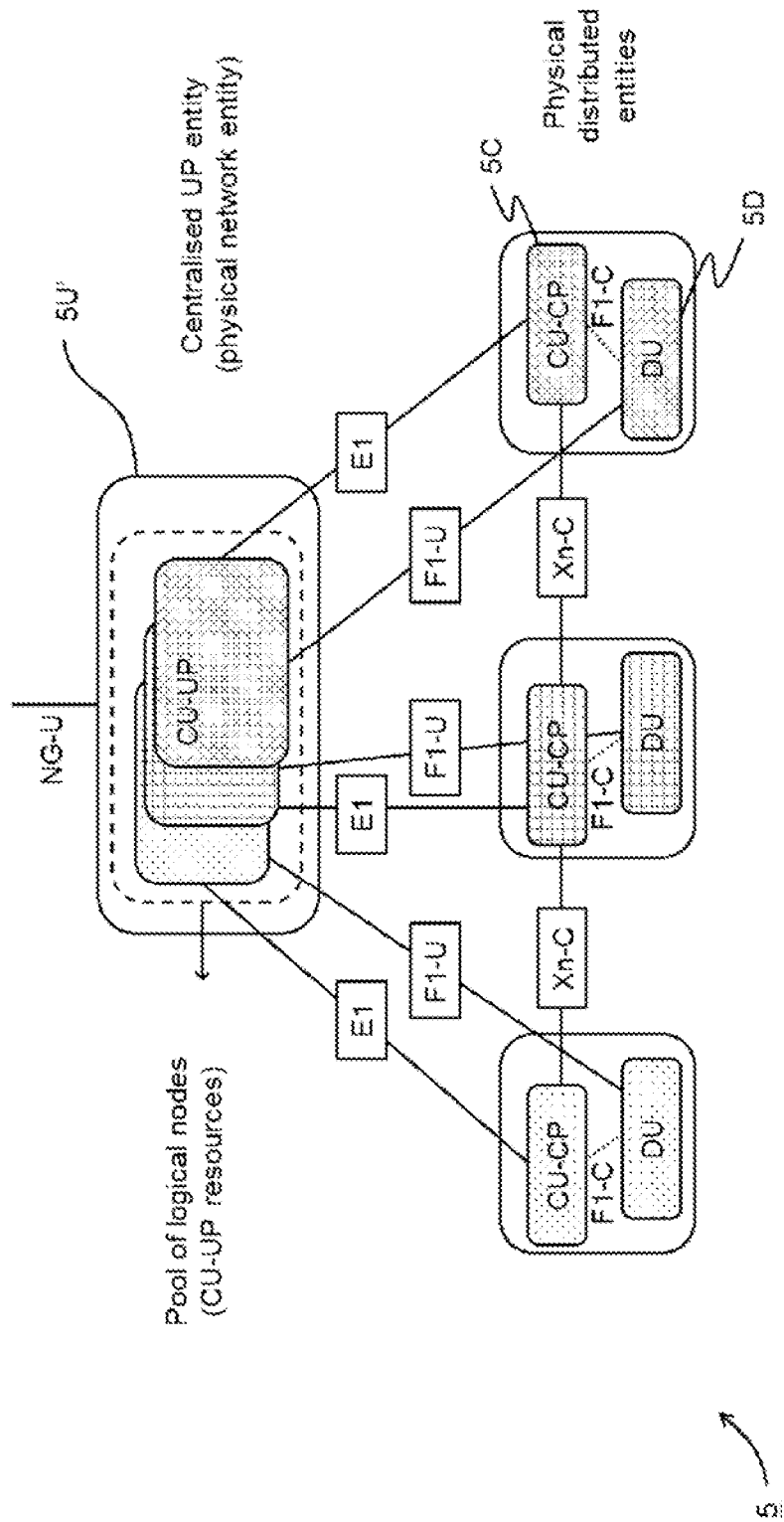
FIG. 10 illustrates schematically an exemplary functional architecture for a distributed base station in accordance with an example embodiment of the present invention.

FIG. 10 illustrates schematically a new deployment scenario which includes a centralised user plane entity referred to as a 'central UP' node 5U'. As can be seen, the central UP node 5U' in this example is a standalone node having a pool of logical nodes (a plurality of gNB-CU-UPs 5U). Each gNB-CU-UP 5U is coupled to a respective gNB-CU-CP 5C and a respective gNB-DU 5D (which are co-located in this example). In other words, a single physical user plane entity 5U' may be coupled to a plurality of physical distributed entities, each physical distributed entity having at least one gNB-CU-CP 5C and at least one gNB-DU 5D. Beneficially, the central UP node 5U' may be configured to support (via at least one gNB-CU-UP 5U logical node thereof) each security algorithm and ROHC profile that a UE 3 may potentially use in the system 1. Thus, when the gNB-CU-CP 5C selects an appropriate security (integrity protection/ciphering) algorithm and ROHC profile for a UE 3, the central UP node 5U' is able to allocate a gNB-CU-UP 5U logical node that supports the selected security algorithm and ROHC profile.

In a fourth option, the capability of a particular gNB-CU-UP 5U may be transferred to the gNB-CU-CP 5C as follows:

The gNB-CU-UP 5U may be configured to forward information identifying its capabilities (security algorithms and ROHC profiles supported by the gNB-CU-UP 5U) to the UPF 11 (over the 'N3' interface therebetween, using e.g. GTP-U (General Packet Radio System (GPRS) Tunnelling Protocol-User Plane)).

The UPF 11 may be configured to forward the gNB-CU-UP's capabilities to a Session Management Function (SMF) (via the 'N4' interface therebetween).

The SMF may be configured to forward the gNB-CU-UP's capabilities to the AMF 12 (via the 'N11' interface therebetween).

The AMF 12 may be configured to forward the gNB-CU-UP's capabilities to the gNB-CU-CP 5C (via the 'N2' interface therebetween).

Alternatively, information identifying the capability of a particular gNB-CU-UP 5U (or that of a plurality of gNB-CU-UPs) may be transferred to the gNB-CU-CP 5C via an Operations and Maintenance (OAM) node.

In a fifth option, a gNB-CU-CP 5C that is aware of a particular gNB-CU-UP's capability may be configured to provide appropriate information identifying these capabilities to another gNB-CU-CP 5C during a procedure involving the other gNB-CU-CP 5C. The procedure involving the other gNB-CU-CP 5C may comprise, for example: a handover; an Evolved Universal Terrestrial Radio Access-New Radio-Dual Connectivity (EN-DC) X2 Setup procedure; an Xn Setup procedure; a Configuration Update procedure; and/or the like (regardless whether or not the procedure involves that particular gNB-CU-UP).

Modifications and Alternatives

Detailed example embodiments have been described above. As those skilled in the art will appreciate, a number of modifications and alternatives can be made to the above example embodiments whilst still benefiting from the inventions embodied therein. By way of illustration only a number of these alternatives and modifications will now be described.

Although the examples described above with reference to FIGS. 8 and 9 refer to a Bearer Context Setup procedure, it will be appreciated that the above examples are also applicable to a Bearer Context Modification procedure (e.g. when the UE already has a bearer context with the base station). In this case the 'Bearer Context Setup Request' message may be replaced with an appropriately formatted 'Bearer Context Modification Request' message, the 'Bearer Context Setup Response' message may be replaced with an appropriately formatted 'Bearer Context Modification Response' message, and the 'Bearer Context Setup Failure' message may be replaced with an appropriately formatted 'Bearer Context Modification Failure' message.

In the above description the gNB-CU-UP is configured to provide appropriate assistance information to the gNB-CU-CP for selecting a different ROHC profile and/or ciphering and integrity algorithm for the UE. Alternatively, the gNB-CU-CP may be configured to select a different gNB-CU-UP for the UE (with the originally requested ROHC profile and ciphering and integrity algorithm).

As a variation of the above described options, it will be appreciated that the same (or an analogous) mechanism may be used for transferring information regarding any capability of the gNB-CU-UP between nodes. For example, SDAP layer related capabilities and/or processing capabilities of the gNB-CU-UP may be transferred from the gNB-CU-UP to the gNB-CU-CP, or from one the gNB-CU-CP to another the gNB-CU-CP (in the same procedure as the security algorithm/ROHC profile transfer or in a separate procedure).

It will be appreciated that the above example embodiments may be applied to both 5G New Radio and LTE systems (E-UTRAN).

In the above description, the UE, the base station, and the AMF are described for ease of understanding as having a number of discrete modules (such as the communication control modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

In the above example embodiments, a number of software modules were described. As those skilled in the art will appreciate, the software modules may be provided in compiled or un-compiled form and may be supplied to the UE, the base station, and the AMF as a signal over a computer network, or on a recording medium. Further, the functionality performed by part or all of this software may be performed using one or more dedicated hardware circuits. However, the use of software modules is preferred as it facilitates the updating of the UE, the base station, and the AMF in order to update their functionalities.

The above example embodiments are also applicable to 'non-mobile' or generally stationary user equipment.

The method performed by the CU-CP may further comprise selecting, when the obtained information indicates that the security configuration is not supported by a CU-UP associated with the UE, at least one of a different security configuration and a different CU-UP for the UE.

The obtaining, by the CU-CP, information indicating whether a security configuration is supported by a CU-UP may comprise receiving a message (e.g. a 'Bearer Context Setup Failure' message or a 'Bearer Context Modification Failure' message) from the CU-UP. In this case, the method performed by the CU-CP may comprise receiving the message in response to initiating a bearer context setup for the UE via the CU-UP.

The information indicating whether a security configuration is supported by a CU-UP may comprise information (e.g. a 'Radio Network Layer Cause' information element) identifying an appropriate cause value indicating at least one of the following: 'encryption protection algorithm not supported'; 'integrity protection algorithm not supported'; 'ROHC profile not supported'.

The method performed by the CU-CP may comprise obtaining the information from the CU-UP when establishing a connection between the CU-CP and the CU-UP.

The method performed by the CU-CP may comprise obtaining the information indicating whether a security configuration for a UE is supported by a CU-UP from the CU-UP indirectly (e.g. via at least one other node).

The method performed by the CU-CP may comprise obtaining the information indicating whether a security configuration for a UE is supported by a CU-UP from another CU-CP.

The method performed by the CU-CP may further comprise: obtaining information indicating whether a header compression profile (e.g. a Robust Header Compression (ROHC) profile and/or the like) is supported by a CU-UP associated with the UE; and when the obtained information indicates that the header compression profile is not supported by the CU-UP associated with the UE, selecting at least one of a different header compression profile and a different CU-UP for the UE.

The method performed by the CU-UP may comprise receiving the information identifying at least one security configuration supported by the UE in a 'Bearer Context Setup Request' message or in a 'Bearer Context Modification Request' message.

The method performed by the CU-UP may comprise providing the information identifying the selected security configuration in a 'Bearer Context Setup Response' message or in a 'Bearer Context Modification Response' message.

The at least one security configuration may comprise at least one of an integrity protection algorithm and a ciphering algorithm. The integrity protection algorithm may comprise one or more of: 'NIA0' (no integrity protection), '128-NIA1' (a 128-bit SNOW 3G based integrity protection algorithm), '128-NIA2' (a 128-bit AES based integrity protection algorithm), and '128-NIA3' (a 128-bit ZUC based integrity protection algorithm). The ciphering algorithm may comprise one or more of: 'NEA0' (no ciphering), '128-NEA1' (a 128-bit SNOW 3G based ciphering algorithm), '128-NEA2' (a 128-bit AES based ciphering algorithm), and '128-NEA3' (a 128-bit ZUC based ciphering algorithm).

The CU-UP may provide a Packet Data Convergence Protocol (PDCP) layer functionality. The distributed base station may comprise a distributed 'gNB', a distributed 'ng-eNB', or a distributed 'En-gNB'.

Various other modifications will be apparent to those skilled in the art and will not be described in further detail here.

Some of or all the above-described example embodiments can be described as in the following Supplementary Notes, but are not limited to the following.

(Supplementary Note 1)
A method performed by a central unit for control plane signalling (CU-CP) of a distributed base station apparatus, the method comprising:
  obtaining information indicating whether a security configuration is supported by a central unit for user plane signalling (CU-UP); and
  selecting a security configuration for a user equipment (UE) based on the obtained information.

(Supplementary Note 2)
The method according to Supplementary Note 1, further comprising:
  when the obtained information indicates that the security configuration is not supported by a CU-UP associated with the UE, selecting at least one of a different security configuration and a different CU-UP for the UE.

(Supplementary Note 3)
The method according to Supplementary Note 1 or 2, wherein the obtaining information indicating whether a security configuration is supported by a CU-UP comprises receiving a message (e.g. a 'Bearer Context Setup Failure' message or a 'Bearer Context Modification Failure' message) from the CU-UP.

(Supplementary Note 4)
The method according to Supplementary Note 3, comprising receiving the message in response to initiating a bearer context setup for the UE via the CU-UP.

(Supplementary Note 5-1)
The method according to Supplementary Note 3 or 4, wherein the information indicating whether a security configuration is supported by a CU-UP comprises information (e.g. a 'Radio Network Layer Cause' information element) identifying an appropriate cause value indicating at least one of the following: 'encryption protection algorithm not supported'; 'integrity protection algorithm not supported'; 'ROHC profile not supported'.

(Supplementary Note 5-2)
The method according to Supplementary Note 1, comprising obtaining the information from the CU-UP when establishing a connection between the CU-CP and the CU-UP.

(Supplementary Note 6)
The method according to Supplementary Note 1, comprising obtaining the information indicating whether a security configuration for a UE is supported by a CU-UP from the CU-UP indirectly (e.g. via at least one other node).

(Supplementary Note 7)
The method according to Supplementary Note 1, comprising obtaining the information indicating whether a security configuration for a UE is supported by a CU-UP from another CU-CP.

(Supplementary Note 8)
The method according to any of Supplementary Notes 1 to 7, further comprising:
  obtaining information indicating whether a header compression profile (e.g. a Robust Header Compression (ROHC) profile and/or the like) is supported by a CU-UP associated with the UE; and
  when the obtained information indicates that the header compression profile is not supported by the CU-UP associated with the UE, selecting at least one of a different header compression profile and a different CU-UP for the UE.

(Supplementary Note 9)
A method performed by a central unit for user plane signalling (CU-UP) of a distributed base station apparatus, the method comprising:
  providing, to a central unit for control plane signalling (CU-CP), information indicating whether a security configuration is supported by the CU-UP.

(Supplementary Note 10)
The method according to Supplementary Note 9, wherein the providing information indicating whether a security configuration is supported by the CU-UP comprises sending a message to the CU-UP (e.g. a 'Bearer Context Setup Failure' message or a 'Bearer Context Modification Failure' message).

(Supplementary Note 11)
The method according to Supplementary Note 9 or 10, wherein the information indicating whether a security configuration is supported by the CU-UP comprises information (e.g. a 'Radio Network Layer Cause' information element) identifying an appropriate cause value indicating at least one of the following: 'encryption protection algorithm not supported'; 'integrity protection algorithm not supported'; 'ROHC profile not supported'.

(Supplementary Note 12)
The method according to Supplementary Note 10, comprising sending the information to the CU-CP when establishing a connection between the CU-CP and the CU-UP.

(Supplementary Note 13)
The method according to any of Supplementary Notes 9 to 12, further comprising:
  providing, to the CU-CP, information indicating whether a header compression profile (e.g. a Robust Header Compression (ROHC) profile and/or the like) is supported by the CU-UP.

(Supplementary Note 14)
A method performed by a central unit for user plane signalling (CU-UP) of a distributed base station apparatus, the method comprising:
  receiving, from a central unit for control plane signalling (CU-CP), information identifying at least one security configuration supported by a user equipment (UE); and
  selecting, based on the received information, a security configuration for the UE; and
  providing, to a central unit for control plane signalling (CU-CP), information identifying the selected security configuration.

(Supplementary Note 15)
The method according to Supplementary Note 14, comprising receiving the information identifying at least one security configuration supported by the UE in a 'Bearer Context Setup Request' message or in a 'Bearer Context Modification Request' message.

(Supplementary Note 16)
The method according to Supplementary Note 14 or 15, comprising providing the information identifying the selected security configuration in a 'Bearer Context Setup Response' message or in a 'Bearer Context Modification Response' message.

(Supplementary Note 17)
A method performed by a central unit for control plane signalling (CU-CP) of a distributed base station apparatus, the method comprising:
sending, to a central unit for user plane signalling (CU-UP), information identifying at least one security configuration supported by a user equipment (UE); and
receiving, from the CU-UP, information identifying a security configuration selected for the UE.

(Supplementary Note 18)
The method according to Supplementary Note 17, comprising sending the information identifying at least one security configuration supported by the UE in a 'Bearer Context Setup Request' message or in a 'Bearer Context Modification Request' message.

(Supplementary Note 19)
The method according to Supplementary Note 17 or 18, comprising receiving the information identifying the selected security configuration in a 'Bearer Context Setup Response' message or in a 'Bearer Context Modification Response' message.

(Supplementary Note 20)
The method according to any of Supplementary Notes 1 to 19, wherein the at least one security configuration comprises at least one of an integrity protection algorithm and a ciphering algorithm.

(Supplementary Note 21)
The method according to Supplementary Note 20, wherein the integrity protection algorithms comprise one or more of: 'NIA0' (no integrity protection), '128-NIA1' (a 128-bit SNOW 3G based integrity protection algorithm), '128-NIA2' (a 128-bit AES based integrity protection algorithm), and '128-NIA3' (a 128-bit ZUC based integrity protection algorithm).

(Supplementary Note 22)
The method according to Supplementary Note 20 or 21, wherein the ciphering algorithms comprise one or more of: 'NEA0' (no ciphering), '128-NEA1' (a 128-bit SNOW 3G based ciphering algorithm), '128-NEA2' (a 128-bit AES based ciphering algorithm), and '128-NEA3' (a 128-bit ZUC based ciphering algorithm).

(Supplementary Note 23)
The method according to any of Supplementary Notes 1 to 22, wherein the CU-UP provides a Packet Data Convergence Protocol (PDCP) layer functionality.

(Supplementary Note 24)
The method according to any of Supplementary Notes 1 to 23, wherein the distributed base station comprises a distributed 'gNB', a distributed 'ng-eNB', or a distributed 'En-gNB'.

(Supplementary Note 25)
A central unit for control plane signalling (CU-CP) of a distributed base station apparatus, the CU-CP comprising:
means for obtaining information indicating whether a security configuration is supported by a central unit for user plane signalling (CU-UP); and
means for selecting a security configuration for a user equipment (UE) based on the obtained information.

(Supplementary Note 26)
A central unit for user plane signalling (CU-UP) of a distributed base station apparatus, the CU-UP comprising:
means for providing, to a central unit for control plane signalling (CU-CP), information indicating whether a security configuration is supported by the CU-UP.

(Supplementary Note 27)
A central unit for user plane signalling (CU-UP) of a distributed base station apparatus, the CU-UP comprising:
means for receiving, from a central unit for control plane signalling (CU-CP), information identifying at least one security configuration supported by a user equipment (UE); and
means for selecting, based on the received information, a security configuration for the UE; and
means for providing, to a central unit for control plane signalling (CU-CP), information identifying the selected security configuration.

(Supplementary Note 28)
A central unit for control plane signalling (CU-CP) of a distributed base station apparatus, the CU-UP comprising:
means for sending, to a central unit for user plane signalling (CU-UP), information identifying at least one security configuration supported by a user equipment (UE); and
means for receiving, from the CU-UP, information identifying a security configuration selected for the UE.

(Supplementary Note 29)
A base station apparatus comprising the CU-CP according to Supplementary Note 25 or 28 and the CU-UP according to Supplementary Note 26 or 27.

(Supplementary Note 30)
A computer implementable instructions product comprising computer implementable instructions for causing a programmable communications device to perform the method according to any of Supplementary Notes 1 to 24.

This application is based upon and claims the benefit of priority from United Kingdom Patent Application No. 1810340.8, filed on Jun. 22, 2018, the disclosure of which is incorporated herein in its entirety by reference.

The invention claimed is:

1. A method performed by a central unit for control plane (CU-CP) node of a distributed base station, the method comprising:
receiving, from a central unit for user plane (CU-UP) node, a bearer context setup failure message or a bearer context modification failure message including a cause value indicating that Packet Data Convergence Protocol (PDCP) configuration including information for Robust Header Compression (ROHC) is not supported.

2. The method according to claim 1, further comprising:
based on the cause value, selecting at least one of a different PDCP configuration and a different CU-UP node for a user equipment (UE).

3. The method according to claim 1, further comprising:
transmitting a bearer context setup request or bearer context modification request including an information element (IE) indicating the PDCP configuration,
wherein the receiving the bearer context setup failure message or bearer context modification failure message is performed in response to the transmitting the bearer context setup request or the bearer context modification request.

4. The method according to claim 1, wherein the cause value is included in a Radio Network Layer Cause information element.

5. A method performed by a central unit for user plane (CU-UP) node of a distributed base station, the method comprising:
transmitting, to a central unit for control plane, (CU-CP) node, a bearer context setup failure message or a bearer context modification failure message comprising a cause value indicating that Packet Data Convergence Protocol (PDCP) configuration including information for Robust Header Compression (ROHC) is not supported.

6. The method according to claim 5, wherein the cause value is included in a Radio Network Layer Cause information element.

7. The method according to claim 5, further comprising:
receiving a bearer context setup request or bearer context modification request including an information element, IE indicating the PDCP configuration,
wherein the transmitting the bearer context setup failure message or bearer context modification failure message is performed in response to the receiving the bearer context setup request or the bearer context modification request.

8. A central unit for control plane (CU-CP) node of a distributed base station, the CU-CP node comprising:
a memory storing instructions; and
at least one processor configured to process the instructions to receive, from a central unit for user plane (CU-UP) node, a bearer context setup failure message or a bearer context modification failure message including a cause value indicating that Packet Data Convergence Protocol (PDCP) configuration including information for Robust Header Compression (ROHC) is not supported.

9. A central unit for user plane (CU-UP) node of a distributed base station, the CU-UP node comprising:
a memory storing instructions; and
at least one processor configured to process the instructions to transmit, to a central unit for control plane (CU-CP) node, a bearer context setup failure message or a bearer context modification failure message including a cause value indicating that Packet Data Convergence Protocol (PDCP) configuration including information for Robust Header Compression (ROHC) is not supported.

* * * * *